SAFETY CIRCUITS FOR CATHODE RAY TUBES

Filed April 13, 1954

INVENTOR
J. E. Best
By Glascock Downing & Seebold
ATTORNEYS

United States Patent Office 2,912,617

Patented Nov. 10, 1959

2,912,617

SAFETY CIRCUITS FOR CATHODE RAY TUBES

John Edward Best, Streatham, London, England, assignor to Electric & Musical Industries Limited, Hayes, Middlesex, England, a British company Application April 13, 1954, Serial No. 422,854

Claims priority, application Great Britain April 14, 1953

5 Claims. (Cl. 315—20)

This invention relates to safety circuits for cathode ray tubes and particularly but not exclusively to such circuits for use in television receivers of the kind employing projection tubes.

In such receivers a known method of safeguarding the cathode ray tube screen against burning by the beam in the event of failure of the line deflection current consists in applying the voltage impulses that appear during return stroke periods across the line scanning coils to a peak detector circuit, the output from this circuit being used to bias a control electrode of the cathode ray tube. Should the scanning current in the coils then fail the output from the peak detector circuit ceases and the cathode ray tube becomes negatively biassed so cutting off the cathode ray beam. With an arrangement of this kind, however, it is necessary to provide the output circuit of the peak detector with a long time constant so that shading is not introduced into the picture in the form of tilt. In consequence it is not possible to reduce the intensity of the cathode ray beam in a rapid manner and it sometimes occurs that the screen is burnt during the period that the beam intensity is being reduced. It is an object of the present invention to provide a safety circuit in which this difficulty is overcome.

According to the present invention there is provided a cathode ray tube arrangement having means for deflecting the cathode ray beam comprising a substantially inductive scanning coil and a driving circuit for feeding a scanning current of saw tooth waveform to said coil so that a voltage of impulsive waveform is set up across turns of said coil, and means for applying a voltage having a waveform similar to said first voltage and derived from or controlled by said first voltage, to a control electrode of said tube for rapidly reducing the intensity of said beam in the event of the failure of said scanning current.

According to a feature of the invention, said last-mentioned means comprises means for limiting said first voltage to a uniform value during the forward strokes of said scanning current to produce said second voltage.

In order that the invention may be clearly understood and readily carried into effect, the invention will be described with reference to the accompanying drawings, in which.

Figure 1:
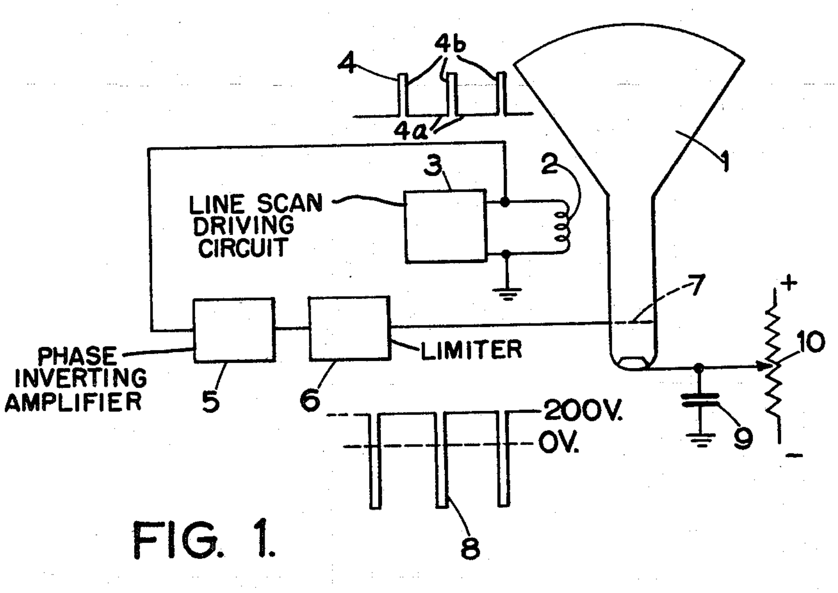
Figure 1 illustrates one example of the present invention.

Referring to Figure 1, reference 1 denotes the cathode ray image reproducing tube of a television receiver, and it will be assumed that the tube is of the projection type. A line scanning coil for the tube is indicated by the reference 2 and it is fed with a scanning current of sawtooth waveform from a driving circuit 3 which is shown merely in block form since it may be of conventional construction. A voltage of impulsive waveform is set up across the coil 2 in known manner, a fragment of the waveform being represented at 4. Thus, during the forward strokes of the scanning current in the coil 2, the waveform 4 consists of portions 4*a* which have a substantially uniform negative value and these portions are separated by positive impulses 4*b* of large amplitude corresponding to the return strokes of the line scanning current. The waveform 4 is applied to a phase inverting amplifier 5 and thence to a limiter 6 and the amplifier and limiter are such that the waveform as it appears at the output of the limiter has the portions 4*a* levelled at a value of 200 volts positive with respect to ground. Limitation to this fixed voltage value avoids the production of shading effects on the screen of the tube due to waveform 4. The amplitude of the potential excursions 4*b* may also be limited. A fragment of the waveform in the output of the limiter is represented by 8 and this waveform is applied directly to the control electrode 7 of the cathode ray tube 1. The waveform 8 is in the form of pulses each of shorter duration than one cycle of the sawtooth waveform of the scanning current fed to the coil 2, and each of which is derived from a portion 4*a* of the waveform 4. The cathode of the cathode ray tube 1 is grounded via a capacitor 9 and connected to a tapping on a potentiometer 10 for the application of a positive bias to the cathode, for biassing the tube 1 to the beam cut-off conduction. The bias applied is however so adjusted in relation to the waveform 8 that the beam of the cathode ray tube is switched on only on the occurrence of the portions 4*a* in the waveform applied to the control electrode 7. In the event of the cessation of the sawtooth current fed to the coil 2, the voltage waveform 8 applied to the control electrode of the cathode ray tube disappears effectively instantaneously and the beam of the cathode ray tube is rapidly cut off. The screen of the cathode ray tube cannot thus be exposed to a beam of high intensity even for so brief a duration as that of a few line periods unless a sawtooth current is flowing in the coil 2 and consequently risk of damage to the screen is substantially avoided. The beam of the cathode ray tube is of course cut off by the impulsive portions 4*b* in the waveform applied to the control electrode 7, these portions corresponding to line return periods.

Figure 2:
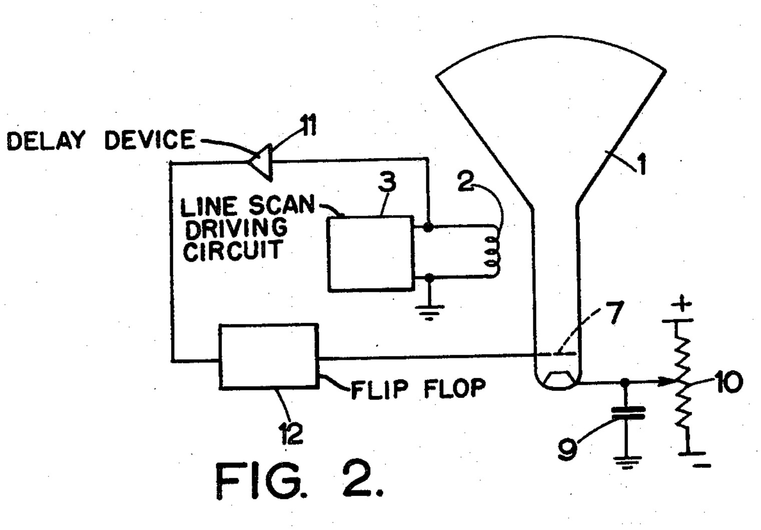
Figure 2 illustrates a modification thereof.

In the modification illustrated in Figure 2, the waveform 4 derived from the scanning coil 2 is applied via a delay device 11 to a flip-flop circuit 12, the delay device and flip-flop circuit being shown merely in block form since they may be of conventional construction. A suitable form of flip-flop is shown, for example, in Figure 35, page 59, of "Time Basis" by O. S. Puckle (Chapman and Hall, 1945). In this construction, the negative excursions 4*b* in the waveform 4 are applied to the flip-flop in such a way as to trigger the flip-flop 12 into its unstable condition, the flip-flop circuit being arranged to return to its stable condition after an interval which is approximately equal in duration to the forward stroke of the scanning waveform in the coil 2 and is thus less than the duration of one cycle of the sawtooth waveform of the scanning currents fed to the coil 2. The delay device 11 is arranged to delay the waveform 4 in such a way that the flip-flop 12 is triggered to its unstable condition at or just before the commencement of each forward stroke and therefore there is derived from the output of the flip-flop circuit 12 a waveform like 8 and controlled by the waveform 4. This waveform is applied to the control electrode 7 and functions in the same manner as the waveform 8 of Figure 1. As aforesaid the state to which the flip-flop returns at about the end of each forward stroke of the line scanning waveform is a stable state and it will be appreciated that in the event of failure of the line scanning current the beam of the cathode ray tube will be cut off at the end of the line period during which the failure occurs and will remain cut off until the scanning circuit is restored so that the screen is not burnt.

While the invention has been described as applied to a safety circuit for cutting off the beam of the cathode ray tube in the event of failure of the line scanning circuit, it can also be applied to safety circuits controlled by the frame scanning circuit, although in this case another stage of amplification may be necessary between the scanning coil and the control electrode for the reason that the voltage of the waveform set up across the frame scanning coil during the forward stroke is of smaller value than that set up across the line scanning coil. The invention is, moreover, not confined to safety circuits for use in television receivers of the projection type and may be applied to the cathode ray tube utilised for effecting scanning in telecine apparatus employing so-called flying spot scanning.

What I claim is:

1. A cathode ray tube arrangement comprising a cathode ray tube, a substantially inductive scanning coil for deflecting the beam of said tube, a driving circuit for feeding a scanning current of sawtooth waveform to said coil, so that a voltage of impulsive waveform having portions recurring at the frequency of said sawtooth waveform is set up across turns of said coil, biassing means for normally preventing switching on of the beam of said tube, shaping means responsive to each of said portions of said impulsive waveform for producing a rectangular pulse of shorter duration than one cycle of said sawtooth waveform and circuit connections for applying pulses from said shaping means to the cathode ray tube to neutralise said biassing means during the pulses.

2. A cathode ray tube arrangement comprising a cathode ray tube, a substantially inductive scanning coil for deflecting the beam of said tube, a driving circuit for feeding a scanning current of sawtooth waveform to said coil, so that a voltage of impulsive waveform having portions corresponding to forward strokes of said sawtooth waveform is set up across turns of said coil, biassing means for normally biassing the beam of said cathode ray tube beyond cut off to prevent switching on of said beam, shaping means for limiting said portions to a substantially uniform voltage to produce rectangular pulses each of shorter duration than one cycle of said sawtooth waveform, and circuit connections for applying pulses from said shaping means to said cathode ray tube to neutralise said biassing means during the pulses.

3. A cathode ray tube arrangement comprising a cathode ray tube, a substantially inductive scanning coil for deflecting the beam of said tube, a driving circuit for feeding a scanning current of sawtooth waveform to said coil, so that a voltage of impulsive waveform having portions recurring at the frequency of said sawtooth waveform is set up across turns of said coils, biassing means for normally biassing the beam of said cathode ray tube beyond cut off to prevent switching on of said beam, a flip-flop responsive to each of said portions of said impulsive waveform to derive a single rectangular impulse of shorter duration than one cycle of said sawtooth waveform, and circuit connections for applying impulses from said flip-flop to said cathode ray tube to neutralise said biassing means during the impulses.

4. A television receiver of the projection type having a cathode ray tube for reproducing light images representing received television signals, a substantially inductive scanning coil for deflecting the beam of said cathode ray tube, a driving circuit for feeding a scanning current of sawtooth waveform to said coil, so that a voltage of impulsive waveform having portions recurring at the frequency of said sawtooth waveform is set up across turns of said coil, biassing means for normally preventing switching on of the beam of said tube in response to received signals, means responsive to each of said portions of said impulsive waveform for producing a rectangular pulse of shorter duration than one cycle of said sawtooth waveform, and circuit connections for applying pulses from said shaping means to said cathode ray tube to neutralise said biassing means during the pulses.

5. Telecine apparatus comprising a cathode ray tube for producing a light trace of television scanning raster, a substantially inductive scanning coil for deflecting the beam of said cathode ray tube, a driving circuit for feeding a scanning current of sawtooth waveform to said coil so that a voltage of impulsive waveform having portions recurring at the frequency of said sawtooth is set up across turns of said coil, biassing means for normally preventing switching on of the beam of said tube, shaping means responsive to each of said portions of said impulsive waveform for producing a rectangular pulse of shorter duration than one cycle of said sawtooth waveform and circuit connections for applying pulses from said shaping means to said cathode ray tube to neutralise said biassing means during the pulses.

References Cited in the file of this patent

UNITED STATES PATENTS

| | | |
|---|---|---|
| 2,227,603 | Poch | Jan. 7, 1941 |
| 2,350,069 | Schrader et al. | May 30, 1944 |
| 2,363,810 | Schrader et al. | Nov. 28, 1944 |
| 2,366,357 | Schlesinger | Jan. 2, 1945 |
| 2,543,831 | Bushman | Mar. 6, 1951 |
| 2,577,848 | Greenleaf et al. | Dec. 11, 1951 |
| 2,584,932 | Snyder et al. | Feb. 5, 1952 |
| 2,607,847 | Heisig | Aug. 19, 1952 |
| 2,743,380 | Pratt | Apr. 24, 1956 |
| 2,750,534 | Anderson | June 12, 1956 |
| 2,752,525 | Montague | June 26, 1956 |
| 2,774,007 | Bigelow | Dec. 11, 1956 |